US012167310B2

(12) United States Patent
Hooker

(10) Patent No.: US 12,167,310 B2
(45) Date of Patent: Dec. 10, 2024

(54) ROAMING DEVICE LOCATION DETERMINATION FOR EMERGENCY COMMUNICATIONS

(71) Applicant: T-Mobile USA, Inc., Bellevue, WA (US)

(72) Inventor: William Michael Hooker, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 403 days.

(21) Appl. No.: 17/529,234

(22) Filed: Nov. 17, 2021

(65) Prior Publication Data

US 2023/0156447 A1 May 18, 2023

(51) Int. Cl.
*H04W 4/90* (2018.01)
*H04W 4/029* (2018.01)
*H04W 8/04* (2009.01)

(52) U.S. Cl.
CPC ............ *H04W 4/90* (2018.02); *H04W 4/029* (2018.02); *H04W 8/04* (2013.01)

(58) Field of Classification Search
CPC .......... H04W 4/90; H04W 4/029; H04W 8/04
See application file for complete search history.

(56) References Cited

U.S. PATENT DOCUMENTS

| 8,280,341 | B2* | 10/2012 | Edelmann | H04L 12/6418 455/404.1 |
| 2004/0157620 | A1* | 8/2004 | Nyu | H04W 4/029 455/403 |
| 2006/0245406 | A1* | 11/2006 | Shim | H04L 63/08 370/338 |
| 2011/0225091 | A1* | 9/2011 | Plastina | H04W 12/12 705/44 |
| 2013/0203373 | A1* | 8/2013 | Edge | H04W 4/12 455/404.1 |
| 2015/0172909 | A1* | 6/2015 | Chandramouli | H04W 4/70 455/433 |
| 2018/0227419 | A1* | 8/2018 | Stojanovski | H04L 65/1045 |
| 2022/0182838 | A1* | 6/2022 | Li | H04L 65/1069 |

* cited by examiner

*Primary Examiner* — Dai Phuong
(74) *Attorney, Agent, or Firm* — Lee & Hayes, P.C.

(57) ABSTRACT

Techniques for determining a location of a roaming device on a host telecommunications network are described herein. The host telecommunications network can implement a location server to determine a geographical location of a user equipment (UE) that generates an emergency message to an emergency service center. The location server can exchange data representing device information, network information, or user information with a subscriber server of a home telecommunications network, and use the data to initiate determination of the geographical location. The location server can initiate, establish, maintain, or otherwise determine a geographical location of the UE for sending to the emergency service center (e.g., to enable the UE to exchange text communications with a Public Service Answering Point).

20 Claims, 8 Drawing Sheets

ROAMING DEVICE LOCATION DETERMINATION FOR EMERGENCY COMMUNICATIONS

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

Telecommunication systems can be associated with different telecommunication service providers. A mobile device can be considered a roaming device when it operates on a network of a telecommunication service provider that is different from the telecommunication service provider with which the device is registered (e.g., pays a fee to receive service). To process a call and/or text while roaming, the telecommunication service provider hosting the roaming device may forward the call to the "home" telecommunication service provider with which the roaming device is registered. In the context of an emergency text communication, the "home" telecommunication service provider is responsible for determining a geographical location of registered devices. However, when a device registered with the "home" telecommunication service provider is a roaming device, the geographical location of the roaming device cannot be determined by the "home" telecommunication service provider due to the roaming device utilizing a different telecommunications service provider. In examples when the roaming device sends a communication requesting emergency service, the "home" telecommunication service provider is unable to send the communication to an emergency service provider because the geographical location of the roaming device is needed to configure the communication for sending to the emergency service provider.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
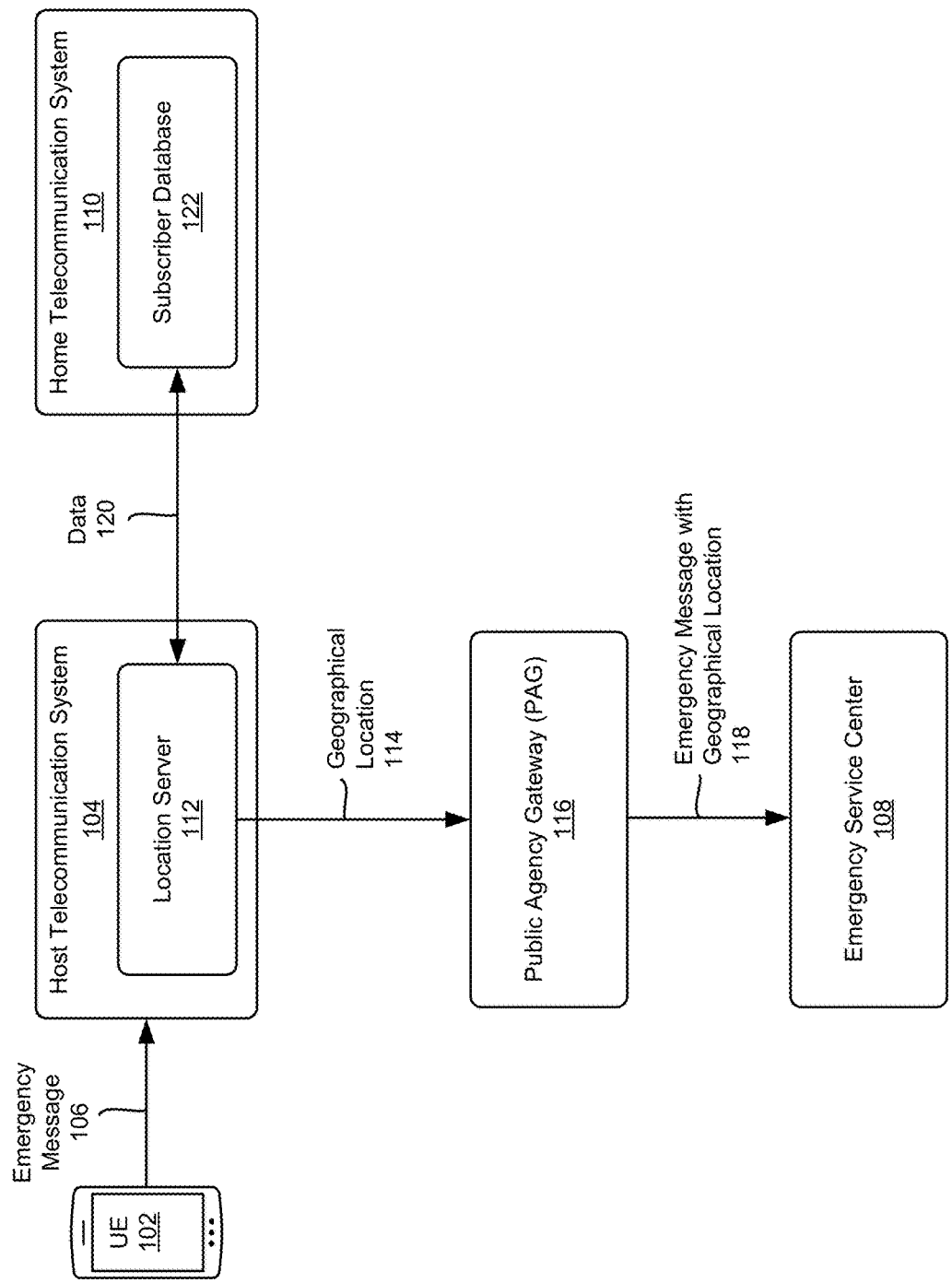
FIG. 1 depicts an example network environment in which an example user equipment can connect to a telecommunication system that includes an example location server to implement the techniques described herein.

This application describes techniques for determining supplemental information for an emergency communication originating by a roaming device. For example, the techniques can include determining location information and/or user information associated with a roaming device that initiates text message for communication with a Public Agency that provides emergency services. Using the techniques described herein, a network provider hosting the roaming device can implement a server to generate, identify, or otherwise determine data including location data, emergency contact data, and/or medical data, just to name few. The server can send the data to a Public Agency Gateway that associates, appends, or otherwise includes the supplemental information with the emergency communication initiated by the roaming device (e.g., a device operating outside an area served by a telecommunication service provider with which the device is registered). In this way, the communication initiated by the roaming device can be routed to a device associated with a closest available Public Agency (Police, Fire, Medical Services, etc.).

Generally, the techniques described herein can include appending geographical location information to a communication originating by a roaming device. That is, the techniques enable substantially real-time location determination of roaming devices for sending to a Public Service Answering Point (PSAP). For instance, the roaming device may wish to send a voice, text, and/or video message to a 911 call center, and a server of a host service provider can exchange data with a Public Agency Gateway and a home service provider to determine the geographical location of the roaming device. The server can receive a request from the Public Agency Gateway for location information and use one or more location techniques to ping, page, or otherwise locate the roaming device in an environment of the host service provider. In this way, the communication (e.g., a text to the 911 call center) that would otherwise be undeliverable (e.g., a location is required to determine the closest PSAP) can instead by communicated to the PSAP.

In some examples, the locating techniques described herein can include a visiting network provider employing a server that determines supplemental information for appending to a communication between a roaming device and a device associated with a Public Agency. The visiting network provider can send the communication request to a home network provider which in turn sends the communication to a Public Agency Gateway. Generally, the Public Agency Gateway creates a communication session between the roaming device and a device associated with the Public Agency. The home network provider can send a network identifier (e.g., a name of the network providing service to the roaming device) to the Public Agency Gateway to indicate that the visiting network provider is to provide location information. The server can receive a request for the location information from the Public Agency Gateway and send a message to a registry (e.g., a Home Subscriber Server (HSS), a Home Location Register (HLR), a Unified Data Management (UDM), and the like) of the home network provider requesting the serving node (network location, cell, base station, etc.) used by the roaming device when generating the request for a communication session. The server can determine a geographical location of the roaming device based on the serving node information received from the registry (e.g., the server can initiate a location determination procedure by communicating with the roaming device and/ or the serving node). The geographical location can represent a current location within an area of the serving node. The server can transmit the geographical location to the Public Agency Gateway which can use the geographical location to establish the communication session with the device associated with the Public Agency. For example, the location techniques performed by the server can enable the Public Agency Gateway to select a PSAP for the communication session based on which available PSAP can best serve the emergency (e.g., a PSAP closest to the geographical location).

In some examples, a system can implement a server that is configured to determine a geographical location of the roaming device based at least in part on transmitting and/or receiving data with a Gateway associated with the Public Agency and a server of a home network provider. For instance, data associated with a network identifier and/or a serving node can be used to initiate a location operation. In some examples, the server (e.g., a Gateway Mobile Location Center (GMLC)) can send a geographical location request to a network element (e.g., a Mobile Management Entity (MME), an Enhanced Serving Mobile Location Center (ESMLC), an Access and Mobility Management Function (AMF), or other network element) and receive the geographical location of the roaming device based on the network element implementing the location operation. In such examples, the system can send the geographical location information to the Gateway that is configured to associate the geographical location with emergency communication data as a communication session (e.g., a voice or text message) between the roaming device and the PSAP.

The systems and techniques disclosed herein may provide emergency location(s) of a roaming device by employing a server that can receive, determine, generate and/or format communications between devices of a Public Agency Gateway associated with an emergency control center and a home network provider. In this way, geographical location data of the roaming device (e.g., a user equipment (UE), an Internet of Things device, a Machine to Machine device, a vehicle computing device, an aerial vehicle device, and so on) is available to enable the Public Agency Gateway to establish an emergency communication with a PSAP. In some examples, the server may send a first request for information from the home service provider, and receive a general network location (e.g., a location of a network element) and/or user information associated with the roaming device from the home service provider based on the first request. The server may also or instead send a second request for a geographical location to network elements) of the host service provider based on the general network location. Upon receiving the geographical location based on the second request from the network element(s), the server can transmit data representing the geographical location to a Public Agency Gateway that uses the geographical information to format the communication for exchange with the emergency control center. By using the systems and techniques disclosed herein, communication requests from the roaming device can be associated with a geographical location that would otherwise be unavailable because the device is roaming.

The techniques described herein can enable secure data exchange between a UE and a PSAP over a core network including initiating, establishing, maintaining, or otherwise determining a message that includes supplemental information (e.g., location data, user data, etc.). By way of example and not limitation, a UE may send a message comprising an image, text, or a video of an emergency event (e.g., a medical event, a criminal event, an environmental event, and so on) proximate to the UE to a PSAP responsible for receiving emergency communications. In such an example, a server associated with a host service provider may enable a Public Agency Gateway to augment or adjust the message with the supplemental information. Further description of establishing the message between the UE and the PSAP can be found throughout this disclosure including in the figures below.

FIG. 1 depicts an example network environment 100 in which an example user equipment (UE) can connect to a host telecommunication system to engage in communication sessions for voice calls, video calls, messaging, data transfers, or other types of communications. For example, a UE 102 can connect to a host telecommunication system 104 for sending an emergency message 106 to an emergency service center 108 (e.g., a PSAP or other public emergency service). Using the techniques described herein, a location of the UE 102, user information (e.g., medical information), and the like can be shared with the emergency service center 108 to enable an improved response to a medical event, a crime in progress, a natural disaster, and so on.

The UE 102 represents any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 102 is illustrated in greater detail in FIG. 7.

In various examples, the host telecommunication system 104 can represent functionality to provide communications between the UE 102 and the emergency service center 108, and can include one or more radio access networks (RANs), as well as one or more core networks linked to the RANs. For instance, the UE 102 can wirelessly connect to a base station or other access point of a RAN, and in turn be connected to the core network(s). The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi® technology, and/or any other previous or future generation of radio access technology. In this way, the host telecommunication system 104 is compatible to operate with other radio technologies including those of other service providers (e.g., the host telecommunications system 104). Accordingly, a message from the UE 102 may be processed by host telecommunication system 104 independent of the technology used by the UE 102.

In some examples, the UE 102 can generate the emergency message 106 (e.g., voice, text, and/or video) that includes a connection request to the emergency service center 108 (e.g., a Public Agency such as Fire, Police, Medical, and so on). In some examples, the emergency message 106 can represent a text from the UE 102 to a 911 call center while the UE 102 is roaming (e.g., receiving service outside an area of the home telecommunications system 110).

The host telecommunication system 104 can send the emergency message 106 (or a portion thereof) through the core network for processing by a home telecommunications system 110 (e.g., a system that the UE 102 is registered to receive service for a fee). In various examples, the home telecommunication system 110 can authenticate a user of the UE 102, identify a network element (a cell, an antennae, a transceiver, a base station, etc.) of the core network serving the UE 102, verify an amount of data available to complete the emergency message 106, and/or store user information (e.g., contact information, medical records, emergency contact information, etc.). Generally, the host telecommunication system 104 can represent a visiting network provider and the home telecommunications system 110 can represent a home network provider.

As depicted in FIG. 1, the host telecommunication system 104 comprises a location server 112 that is configured to implement different locating techniques to provide a geographical location 114 of the UE 102 to a Public Agency Gateway (PAG) 116. The location server 112 can initiate request(s) to locate the UE 102 to one or more network elements (also referred to as "network nodes") of the host telecommunication system 104. For instance, the location server 112 can send a request for a current location of the UE 102 to an MME that is configured to location the UE 102 relative to the network element and/or relative to a map coordinate system. The location server 112 can, in some examples, receive the geographical location 114 of the UE 102 from the MME (or other network element) depending on a type of technology used to locate the UE 102. In various examples, the geographical location 114 can represent a position of the UE 102 relative to a map coordinate system (e.g., a location in an environment with longitude, latitude, elevation, etc.).

The PAG 116 is configured to establish a communication session between the UE 102 and the emergency service center 108. The communication session can include one or more of: a transmission control protocol (TCP), an internet protocol (IP), a user datagram protocol (UDP), a simple mail transport protocol (SMTP), a file transfer protocol (FTP), a hypertext transfer protocol (HTTP), or a hypertext transfer protocol secure (HTTPS). Based on receiving the geographical location 114 from the location server 112, the PAG 116 can generate an emergency message with geographical location 118 for sending to the emergency service center 108.

Generally, the location server 112 can exchange data 120 with a subscriber database 122 (or other component) of the home telecommunication system 110. The data 120 can represent data associated with the emergency message 106 and can include one or more of: a network identifier of the UE 102, a request for location information, a location of the network element serving the UE 102, user information data, and the like. In some examples, the subscriber database 122 can include serving node information captured by the home telecommunication system 110 during a registration process for services and/or responsive to the UE 102 changing to another serving node.

As mentioned, the location server 112 can determine the geographical location 114 of the UE 102 based at least in part on the data 120. For instance, the location server 112 can send a request to the subscriber database 122 for a network location associated with the emergency message 106 (e.g., the network element that received the emergency message 106). In such examples, the location server 112 can determine the geographical location 114 based at least in part on the data 120 indicating the location of the network element serving the UE 102. That is, the location server 112 can send a geographical location request to the network element to determine a more precise location of the UE 102 than the location of the network element. In this way, the location server 112 can initiate an exact position (e.g., within one meter) for the UE 102 within an area of the network element.

In some examples, the home telecommunication system 110 can send the data 120 representing medical information, emergency contact information, or other user information to the location server 112 which can forward the data 120 to the PAG 116 for appending to the emergency message 106. Accordingly, the location server 112 can remotely access the data 120 from the home telecommunication system 110 to aggregate or otherwise determine information usable to perform various locating techniques and/or to improve the content of the emergency message 106 (e.g. to automatically generate useful information for the emergency service center 108 that is not otherwise included in the emergency message 106.

In some examples, the host telecommunication system 104 can determine that the UE 102 is a roaming device based at least in part on the network identifier associated with the emergency message 106, and generate a request for device data (e.g., data indicating that the UE 102 has credit to complete the communication session involving the emergency message 106), network location data (the location of the network element serving the UE 102), or user data (is any user information available that can be included in the emergency message 106) for sending to the home telecommunication system 110.

The subscriber database 122 (e.g., a Home Subscriber Server) of the home telecommunication system 110 can receive, manage, and otherwise store subscriber information including the device data, the network location data, and/or the user data. For instance, the subscriber database 122 can be configured as to send and/or receive user information, registration information, motion information, and other information associated with the UE 102 with the location server 112.

Generally, the location server 112 can receive the data 120 (e.g., the location of the network element) from the home telecommunication system 110 and determine the geographical location 114 of the UE 102 using one or more locating techniques. In various examples, the location server 112 can generate a request to ping, page, or otherwise locate the UE 102 within the host telecommunication system 104. In some examples, the data 120 can identify a serving node (or network element) used to provide service to the UE 102, and the location server 112 can initiate a locating technique to locate the UE 102 in the serving node (e.g., send a request for a location to an MME, AMF, ESMLC, and the like). The PAG 116 can establish the communication session between the UE 102 and the emergency service center 108 based at least in part on the geographical location 114 which otherwise could not be completed due to a lack of a geographical location of the UE 102 (e.g., the roaming device) being known by the home telecommunication system 110.

By implementing the techniques described herein, the location server 112 can initiate, identify, or otherwise determine the geographical location 114 usable for the PAG 116 to complete communications between the 102 UE and the emergency service center 108 including when the UE 102 is roaming on to the host telecommunication system 104. Additional detail for using the location server 112 to perform locating techniques is discussed throughout this disclosure including in the descriptions of the other figures.

Figure 2:
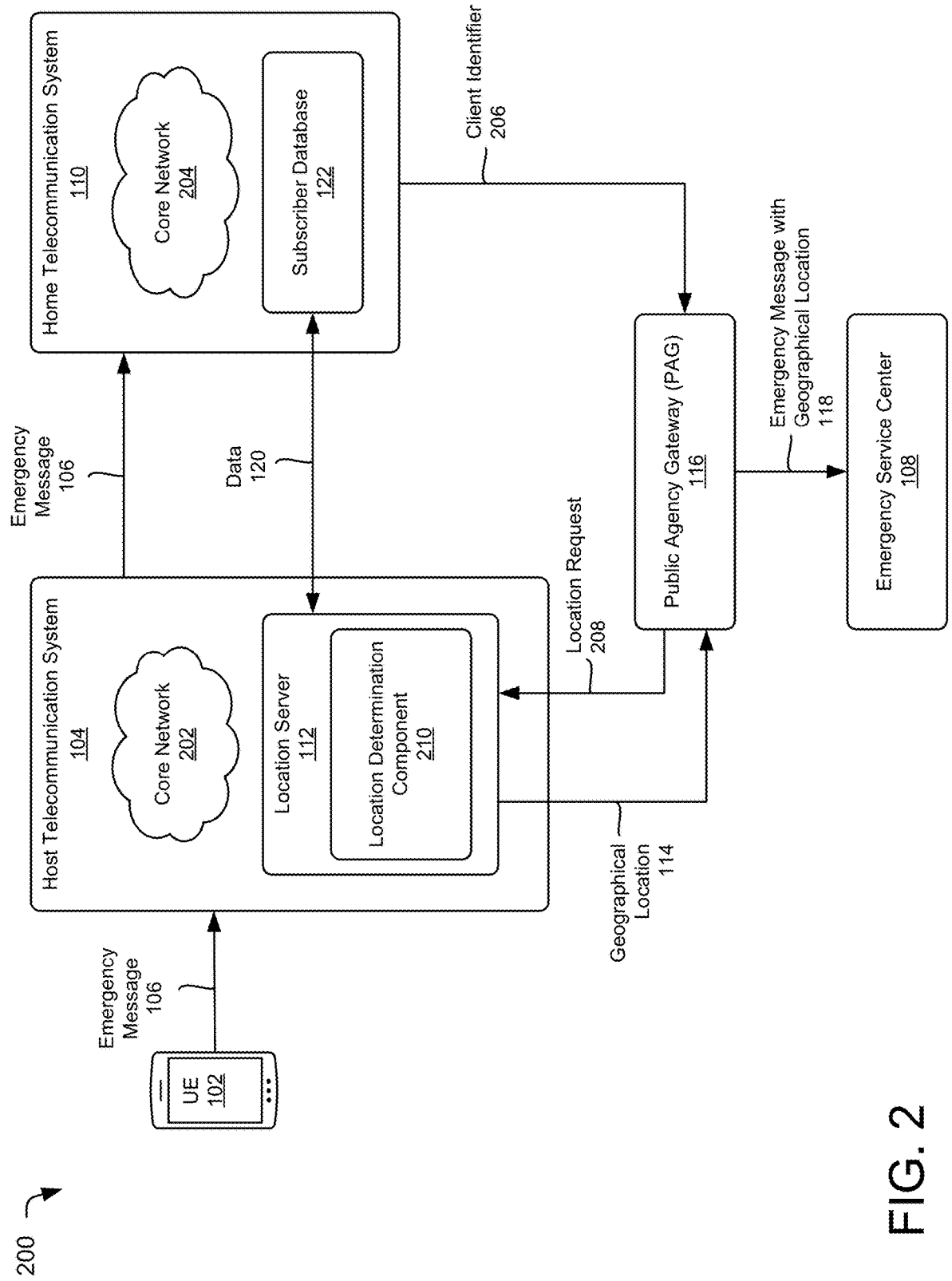
FIG. 2 depicts another example network environment in which an example user equipment can connect to a telecommunication system that includes an example location server to implement the techniques described herein.

FIG. 2 depicts another example network environment in which an example user equipment can connect to a telecommunication system that includes an example location server to implement the techniques described herein. For example, the UE 102 can connect to the host telecommunication system 104 using a core network 202 and/or the home telecommunication system 110 using a core network 204 to send the emergency message 106 to the emergency service center 108.

The core network 202 and/or the core network 204 can, in some examples, determine a connection between the UE 102, the emergency service center 108, the location server 112, the PAG 116 that configures the emergency message 106 with the geographical location 114. For example, the UE 102, the location server 112, the PAG 116, and/or the subscriber database 122 can exchange Session Initiation Protocol (SIP) messages to set up and manage individual communication sessions. Further discussions of exchanging a SIP message are included throughout this disclosure including in FIGS. 5 and 6.

In some examples, the core network 202 and/or the core network 204 can represent a service-based architecture that includes multiple types of network functions that process control plane data and/or user plane data to implement services for the UE 102. In some examples, the services comprise the emergency communications (e.g., the emergency message 106, the emergency message with geographical location 118, and the like) which may include a text, a data file transfer, an image, a video, a combination thereof, and so on. The network functions of the core network 202 and/or the core network 204 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 3, and elsewhere.

Figure 3:
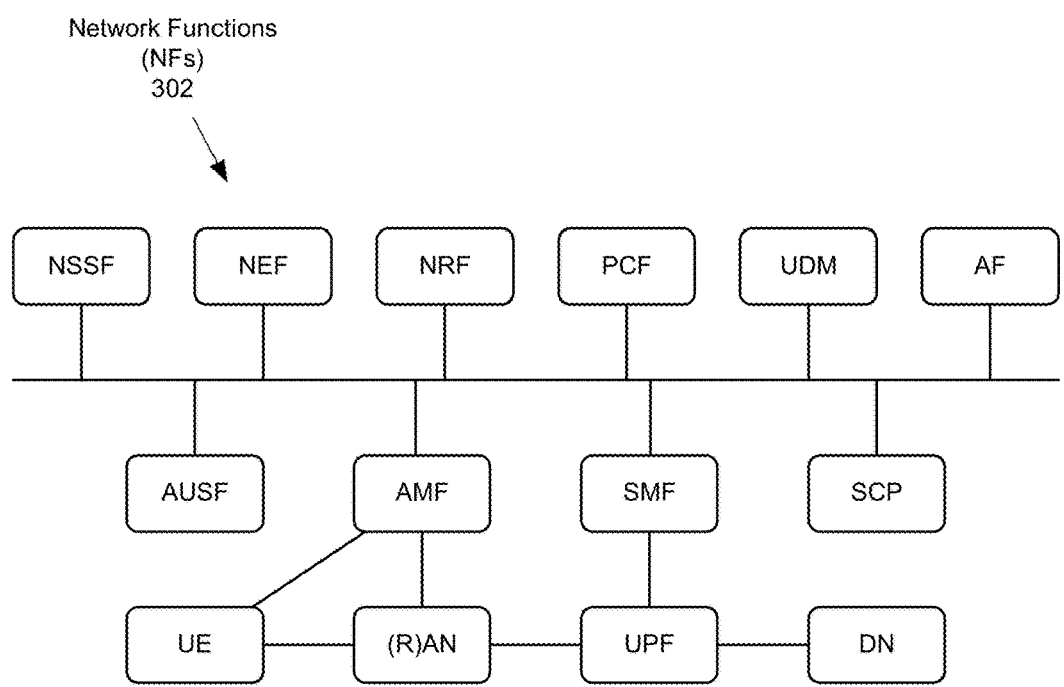
FIG. 3 depicts an example system architecture for a fifth generation (5G) telecommunication network.

FIG. 3 depicts an example system architecture for a fifth generation (5G) telecommunication network. In some examples, the telecommunication network can comprise the core network 202 and/or the core network 204 in FIG. 2 that includes a service-based system architecture in which different types of network functions (NFs) 302 operate alone and/or together to implement services. Standards for 5G communications define many types of NFs 302 that can be present in 5G telecommunication networks (e.g., the core network 202 or the core network 204), including an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 3.

One or more of the NFs 302 of the core network 202 and/or the core network 204 can be implemented as network applications that execute within containers (not shown). 5G NFs 302 can execute as hardware elements, software elements, and/or combinations of the two within telecommunication network(s), and accordingly many types of 5G NFs 302 can be implemented as software and/or as virtualized functions that execute on cloud servers or other computing devices. Network applications that can execute within containers can also include any other type of network function, application, entity, module, element, or node.

FIG. 2 further depicts the host telecommunication system 104 sending the emergency message 106 to the home telecommunication system 110 based at least in part on an indication that the UE 102 is a roaming device. Accordingly, the home telecommunication system 110 can verify an identity of a user of the UE 102, an amount of credit (e.g., verifies an amount of available data to complete a communication), and so on, to connect the emergency message 106. In some examples, the home telecommunication system 110 can send a client identifier 206 to the PAG 116 usable to identify which network provider is receiving the emergency message 106. In such examples, the PAG 116 can identify the host telecommunication system 104 as generating the emergency message 106 based at least in part on the client identifier 206 (e.g., an identifier associated with the UE 102 such as a Fully Qualified Domain Name (FQDN)).

In some examples, the PAG 116 can generate a location request 208 (e.g., a communication, a message, etc.) for sending over a core network (e.g., the core network 202 and/or the core network 204) to the location server 112 of the host telecommunication system 104. Based at least in part on receiving the location request 208, the location server 112 can communicate with the subscriber database 122 (by exchanging the data 120) to determine a location of the UE 102 relative to a network element (also referred to as a "serving node") such as a base station, an antennae, a transceiver, among others. The subscriber database 122 can send a network location to the location server 112 that indicates the network element serving the UE 102. This enables the location server 112 to initiate a location test (e.g., paging or pinging the UE 102, etc.) using a most effective location determination technique for the identified network element.

As shown in FIG. 2, the location server 112 comprises a location determination component 210 that is configured to determine the geographical location 114 by generating a message requesting a current location of the UE 102 relative to the network element or a coordinate system. In some examples, the location determination component 210 can communicate with different network element types to send the message, and receive graphical location data representing the current location of the UE 102.

FIG. 2 further depicts the location server 112 transmitting the geographical location 114 to the PAG 116 for appending to the emergency message 106. For example, the home telecommunication system 110 can forward the emergency message 106 to the PAG 116 after identifying that the UE 102 is roaming and therefore the home telecommunication system 110 is unable to locate the UE 102. In various examples, the PAG 116 can add, modify, or otherwise append the geographical location 114 to the emergency message 106 to form the emergency message with geographical location 118. The emergency service center 108 can use the emergency message with geographical location 118 to format a first communication as well as subsequent communication(s) with the UE 102. In examples when the emergency service center 108 represents a PSAP, the PAG 116 can use the geographical location 114 to select a closest available PSAP from a set of available PSAPs to receive the emergency message with geographical location 118. Further description of determining a location of a roaming device can be found throughout this disclosure.

Figure 4:
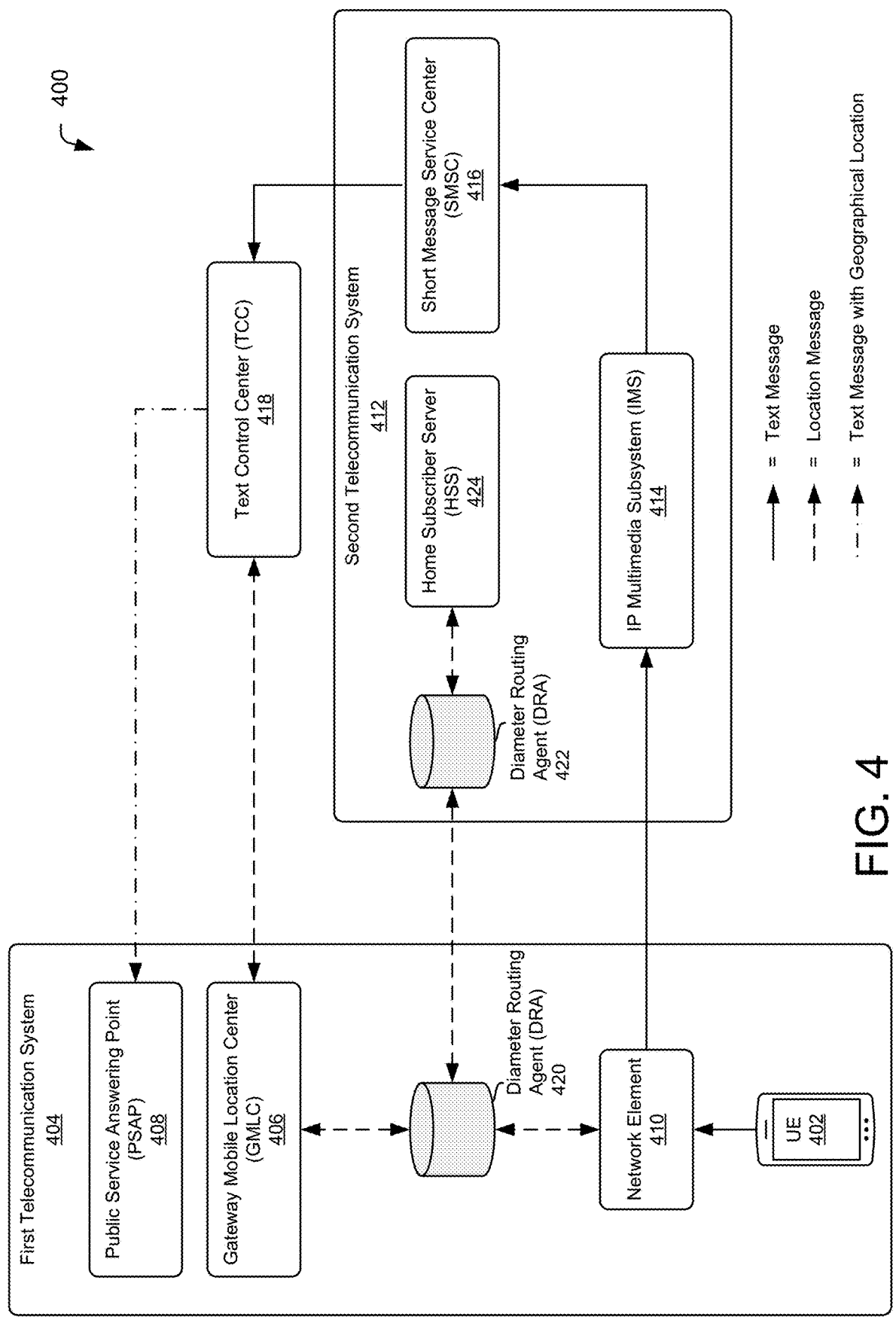
FIG. 4 depicts an example Gateway Mobile Location Center (GMLC)) implementing techniques to determine a geographical location of an example user equipment (UE) operating as a roaming device.

FIG. 4 depicts an example Gateway Mobile Location Center (GMLC)) implementing techniques to determine a geographical location of an example user equipment (UE) operating as a roaming device. For instance, a UE 402 operating on a first telecommunication system 404 (e.g., a host network provider) can generate an emergency text message, and a GMLC 406 can determine a geographical location of the UE 402 usable to connect the UE 402 with a PSAP 408. In some examples, the GMLC 406 can provide the functionality of the location server 112.

In some examples, the UE 402 can send the text message to a network element 410 (e.g., a base station, an antennae, a transceiver, or other serving node). The first telecommunication system 404 can identify that the UE 402 is a roaming device and send the text message to a second telecommunication system 412 (e.g., a home network provider) for authentication, charging, etc. In particular, the network element can use a core network to transmit the text message to an IP multimedia subsystem (IMS) 414 which can forward the text message to a Short Message Service Center (SMSC) 416 for processing. The SMSC 416 can transmit the text message to a Text Control Center (TCC) 418 that is configured to establish a communication session between the UE 402 and the PSAP 408. In various examples, the TCC 418 can provide the functionality of the Public Agency Gateway 116.

The TCC 418 can, for example, send a location message requesting a location of the UE 402 to the GMLC 406 based at least in part on a network identifier identifying the UE 402 as operating on the first telecommunications system 404. For example, the second telecommunication system 412 can send the text message along with the network identifier to the TCC 418 to generate an initial communication session with the PSAP 408. In various examples, communications between the TCC 418 and the GMLC 406 can include a Mobile Location Protocol (MLP).

The GMLC 406 can, in some examples, utilize a Diameter Routing Agent (DRA) 420 of the first telecommunication system 404 for sending a network location request to a Diameter Routing Agent (DRA) 420 of the second telecommunication system 412. The DRA 420 and the DRA 422 can use an SLh interface and/or an SLg interface to send communications between the GMLC 406 and a Home Subscriber Server (HSS) 424.

Generally, the HSS 424 can provide functionality of the subscriber database 122 including storing network information, device information, and user information. In some examples, the HSS 424 can send information about the network element 410 used by the UE 402 when sending the text message. The GMLC 406 can utilize the DRA 420 to send a request for a geographical location of the UE 402 to the network element 410. In this way, the network element 410 can implement one or more locating techniques to locate a position of the UE 402 in a map coordinate system. That is, the GMLC 406 can determine the geographical location of the UE 402 (e.g., a two dimensional or three dimensional location). In one specific example, the GMLC 406 can locate the UE 402 on a specific floor of a building or other structure to provide a current location of the UE 402 requesting emergency service.

In some examples, the HSS 424 can also communicate user information usable by the PSAP 408 to provide emergency service. For example, the GMLC 406 can request, query, receive, or otherwise access emergency contract information, medical information, or other user information from the HSS 424 to provide the PSAP 408 with helpful information in addition to the geographical location. The GMLC 406 can, for example, send the geographical location and user information to the TCC 418, and the TCC 418 can determine a communication session between the UE 402 and the PSAP 408 that includes the geographical location and the user information.

Figure 5:
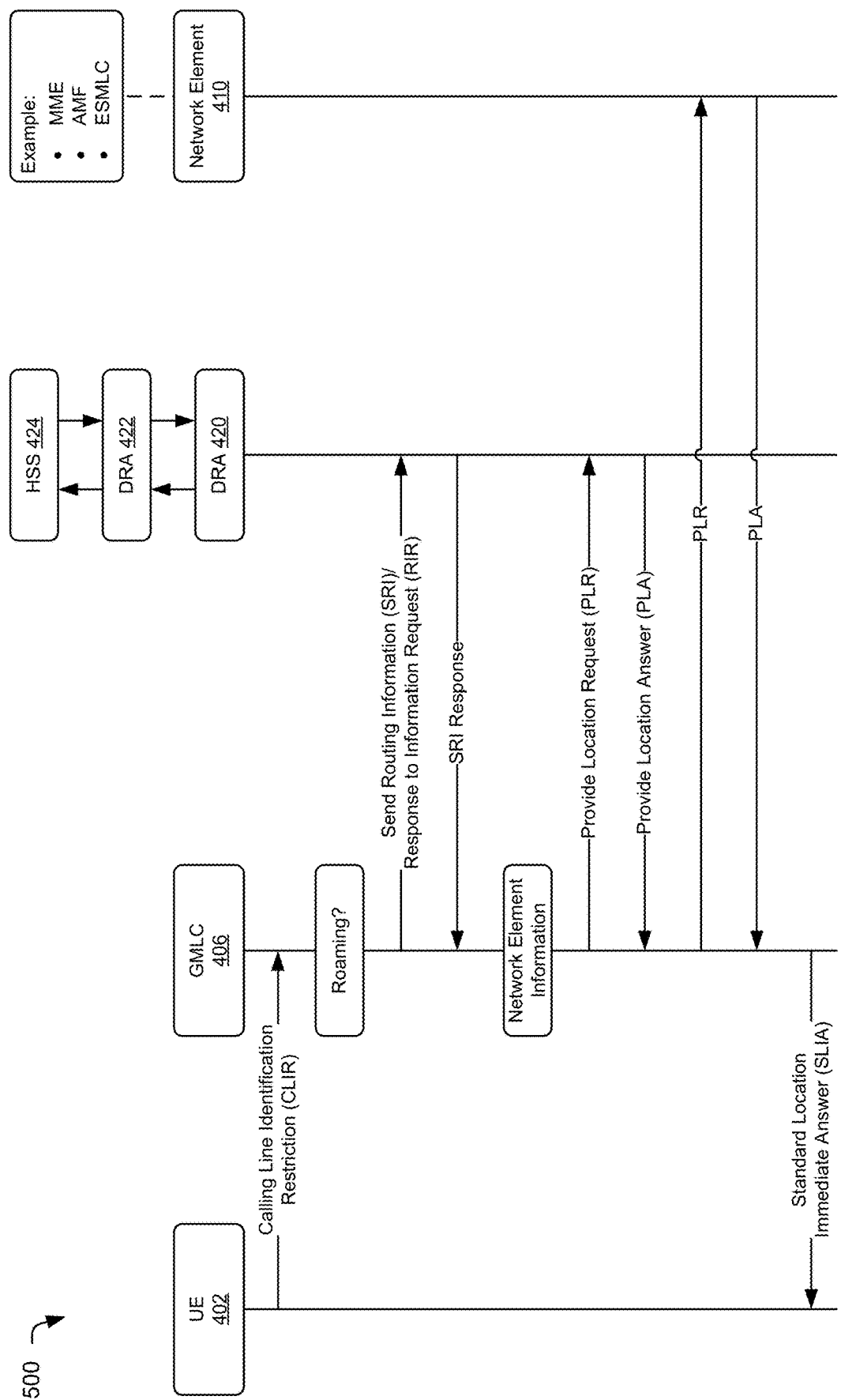
FIG. 5 depicts a messaging flow during an example call setup through an example Gateway Mobile Location Center (GMLC).

FIG. 5 depicts a messaging flow during an example call setup through an example Gateway Mobile Location Center (GMLC). In some examples, the messaging flow as shown in FIG. 5 can represent activity to determine supplemental data by the GMLC 406 during the establishing and maintaining of a communication (e.g., the emergency message 106, the emergency message with geographical location 118) between the UE 102 and PSAP 408. For example, the UE 402 can initiate a text message for sending to the PSAP 408, and the GMLC 406 can provide geographical location data to the TCC 418 based on data exchanged with the HSS 424 and the network element 410.

In some examples, the massage flow can include messaging associated with an IMS, such as a Session Initiation Protocol (SIP) messaging flow, while in other examples the message flow can represent a messaging flow that does not include communications with an IMS.

The messaging flow as shown in FIG. 5 can include the UE 402 sending a calling line identification restriction (CLIR) to the GMLC 406 usable for the GMLC 406 to determine that the UE 402 is a roaming device. For example, the CLIR can include a subscriber identifier (e.g., a Mobile Station Integrated Services Digital Network (MSISDN)) and an indication that the message is associated with an emergency intended for a PSAP.

Responsive to determining that the UE 402 is roaming, the GMLC 406 can send a Send Routing Information (SRI) and/or a Response to Information Request (RIR) to the HSS 424 via the DRA 420 and the DRA 422. The SRI and/or the RIR can include the MSISDN for sharing with the HSS 424. The messaging flow can also include the HSS 424 sending an SRI response to the GMLC 406 usable for the GMLC 406 to identify network element information (e.g., a network element identity, location, etc.) associated with the text message by the UE 402.

The messaging flow of FIG. 5 can also include the GMLC 406 sending a provide location request (PLR) to the HSS 424 which can return a provide location answer (PLA). For instance, the MSISDN can identify the UE 402 and the PLA can include a location estimation of the UE 402 relative to the network element 410. In some examples, the network element can represent an MME, an AMF, an ESMLC, a Location Management Function (LMF), or other entity responsible for determining a geographical location of the UE 402.

The GMLC 406 can initiate a PLR to the network element 410 based at least in part on the PLA received from the HSS 424, and receive a PLA from the network element 410 indicating a geographical location of the UE 402. In various examples, the GMLC 406 can send a Standard Location Immediate Answer (SLIA) to the UE 402.

Figure 6:
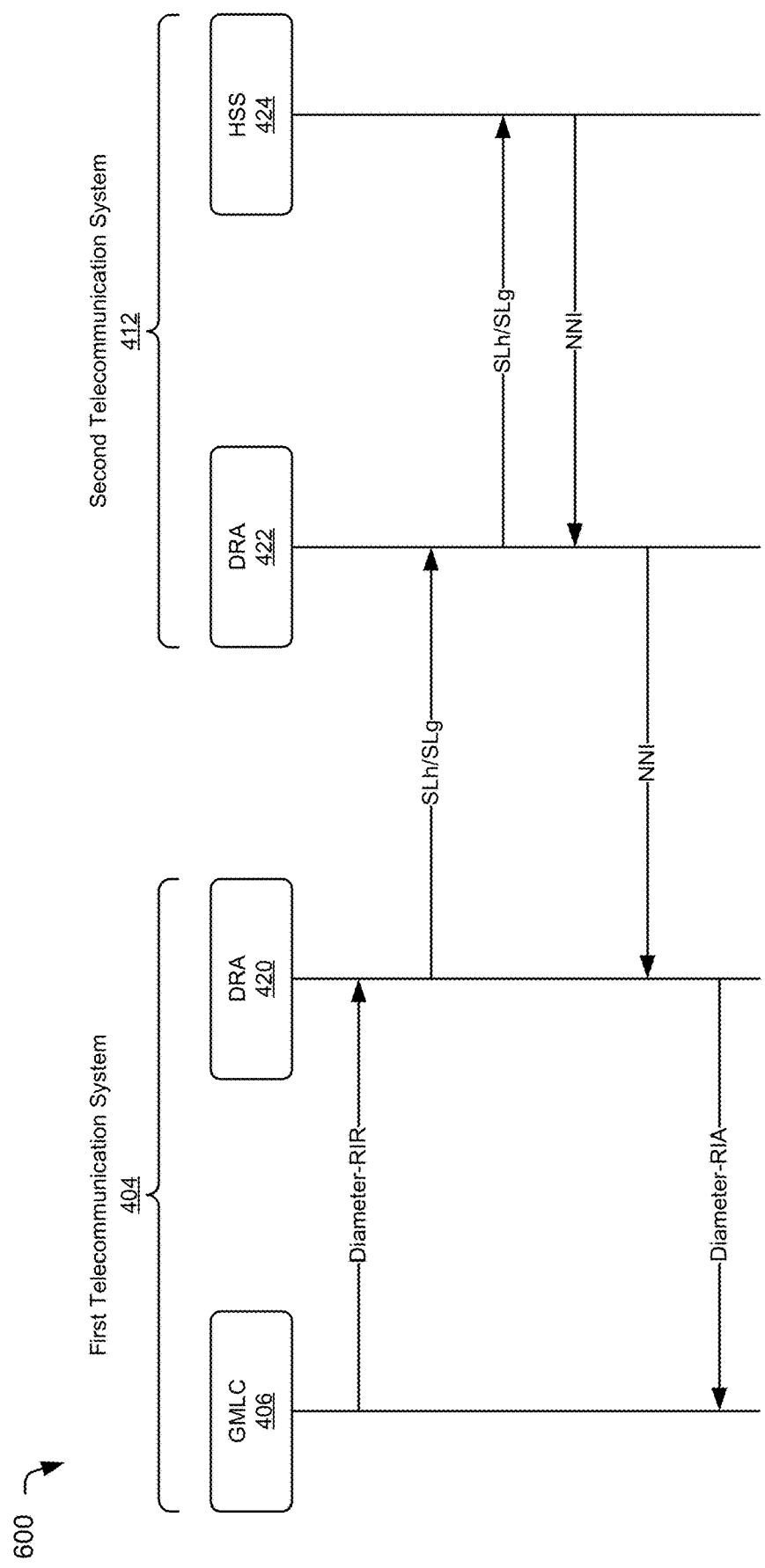
FIG. 6 depicts another Session Initiation Protocol (SIP) messaging flow during an example call setup through an example Gateway Mobile Location Center (GMLC).

FIG. 6 depicts another Session Initiation Protocol (SIP) messaging flow during an example call setup through an example Gateway Mobile Location Center (GMLC). For instance, FIG. 6 can show additional detail of the exchange between the GMLC 406 and the HSS 424.

The messaging flow as shown in FIG. 6 can include the first telecommunication system 404 and the second telecommunication system 412 exchanging device information, network information, and/or user information between the GMLC 406. For instance, the GMLC 406 can send a diameter Response to Information Request (RIR) to the DRA 420 which can use an SLh interface and/or an SLg interface to communicate with the DRA 422. In some examples, the DRA 422 can send the diameter RIR to the HSS 424 and the HSS 424 can return a diameter Response to Information Answer (RIA) to the GMLC 406 via the DRA 422 and the DRA 420.

Figure 7:
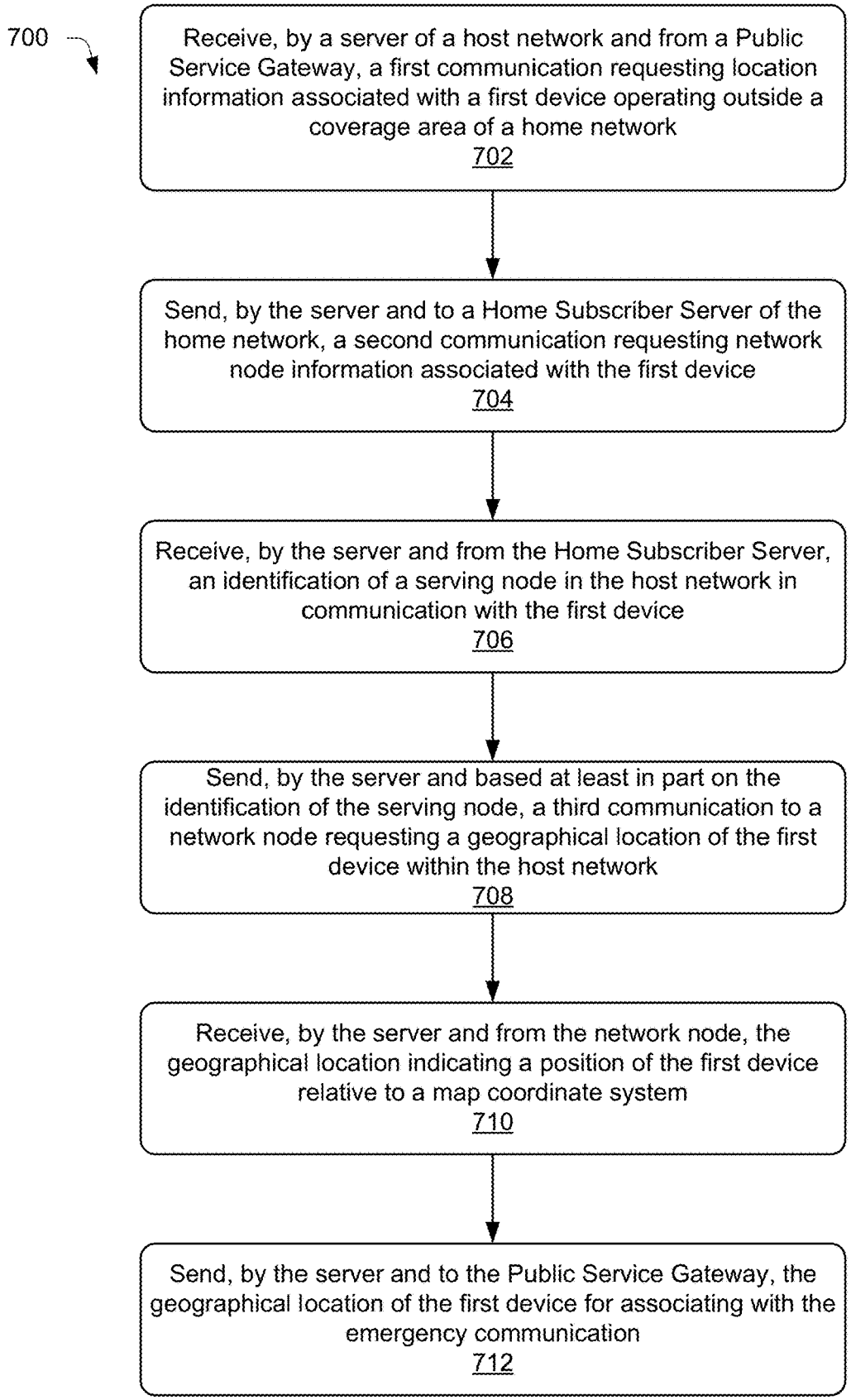
FIG. 7 depicts a flowchart of an example process for determining a location of an example user equipment roaming on a host telecommunications system.

FIG. 7 depicts a flowchart of an example process 700 for determining a location of an example user equipment roaming on a host telecommunications system. Some or all of the process 700 may be performed by one or more components in FIGS. 1-6, as described herein. For example, some or all of process 700 may be performed by the location server 112 and/or the GMLC 406.

At operation 702, the process may include receiving, by a server of a host network and from a Public Agency Gateway, a first communication requesting location information associated with a first device operating outside a coverage area of a home network, the Public Agency Gateway (PAG) configured to establish an emergency communication between the first device and a second device associated with a Public Service Answering Point (PSAP). In some examples, the operation 702 may include the location server 112 (or the GMLC 406) receiving a location request from the PAG 116 (or TCC 418) to initiate a communication session between a roaming device (e.g., UE 102 or UE 402) and another device associated with the PSAP.

By way of example and not limitation, a UE of a first telecommunication system that includes a core network can send an emergency message comprising an image, a video, and/or a file transfer to an emergency service center (e.g., a 911 Center) associated with the PSAP (e.g., PSAP 408). A second telecommunication system (e.g., a home network) can send the emergency message to the PAG to cause the PAG to generate the first communication to the location server 112 of the first telecommunication system. Communications including the request for location information can include the location server 112 and the PAG 116 implementing a Mobile Location Protocol or a web service.

At operation 704, the process may include sending, by the server and to a Home Subscriber Server of the home network, a second communication requesting network node information associated with the first device. In some examples, the operation 704 may include the location server 112 sending a communication to the subscriber database 122 (or the HSS 424) to identify a network element (or serving node) serving the UE (the first device) that originated the emergency message. For instance, the location server 112 can generate a message requesting a location of the UE relative to the network element (e.g., a network location). In various examples, transmitting the second communication can include using one or more Diameter Routing Agents associated with the home network and the subscriber database 122. Using the techniques described herein, the location server 112 can exchange data with the subscriber database 122 to determine a geographical location of the first device to establish a communication session with the PSAP.

At operation 706, the process may include receiving, by the server and from the Home Subscriber Server, an identification of a serving node in the host network in communication with the first device. In some examples, the operation 706 may include the subscriber database 122 (or the HSS 424) sending the location server 112 data representing an identifier and/or a location of the serving node that received the emergency message from the first device. In various examples, the serving node can comprise information about the network elements providing service to the first device. In one specific example, the identification of the serving node can include a Fully Qualified Domain Name (FQDN).

At operation 708, the process may include sending, by the server and based at least in part on the identification of the serving node, a third communication to a network node requesting a geographical location of the first device within the host network. In some examples, the operation 708 may include the location server 112 sending a request for a geographical location of the first device (e.g., coordinates relative to a coordinate system, etc.) to an entity of the host network (e.g., a node associated with the FQDN).

At operation 710, the process may include receiving, by the server and from the network node, the geographical location indicating a position of the first device relative to a map coordinate system. In some examples, the operation 710 may include the location server 112 receiving the geographical location 114 based at least in part on the third communication. For example, the GMLC 406 can send a request for the geographical location to the network node which performs a locating technique, and returns the geographical location of the first device to the GMLC 406.

At operation 712, the process may include sending, by the server and to the Public Agency Gateway, the geographical location of the first device for associating with the emergency communication. In some examples, the operation 712 may include the location server 112 sending the geographical location 114 to the PAG 116 for appending to the emergency message 106. In other examples, the GMLC 406 may also send user information to the PAG 116 for associating with the emergency communication. Sending the geographical and/or user information to the PAG 116 can cause the PAG 116 to configure the emergency message with supplemental information usable to establish a communication session with a device of a Public Service Answering Point. In some examples, the process can include additional operations to continuously determine the geographical location of the first device to maintain, track, or otherwise determine a current geographical location the first device over time.

Figure 8:
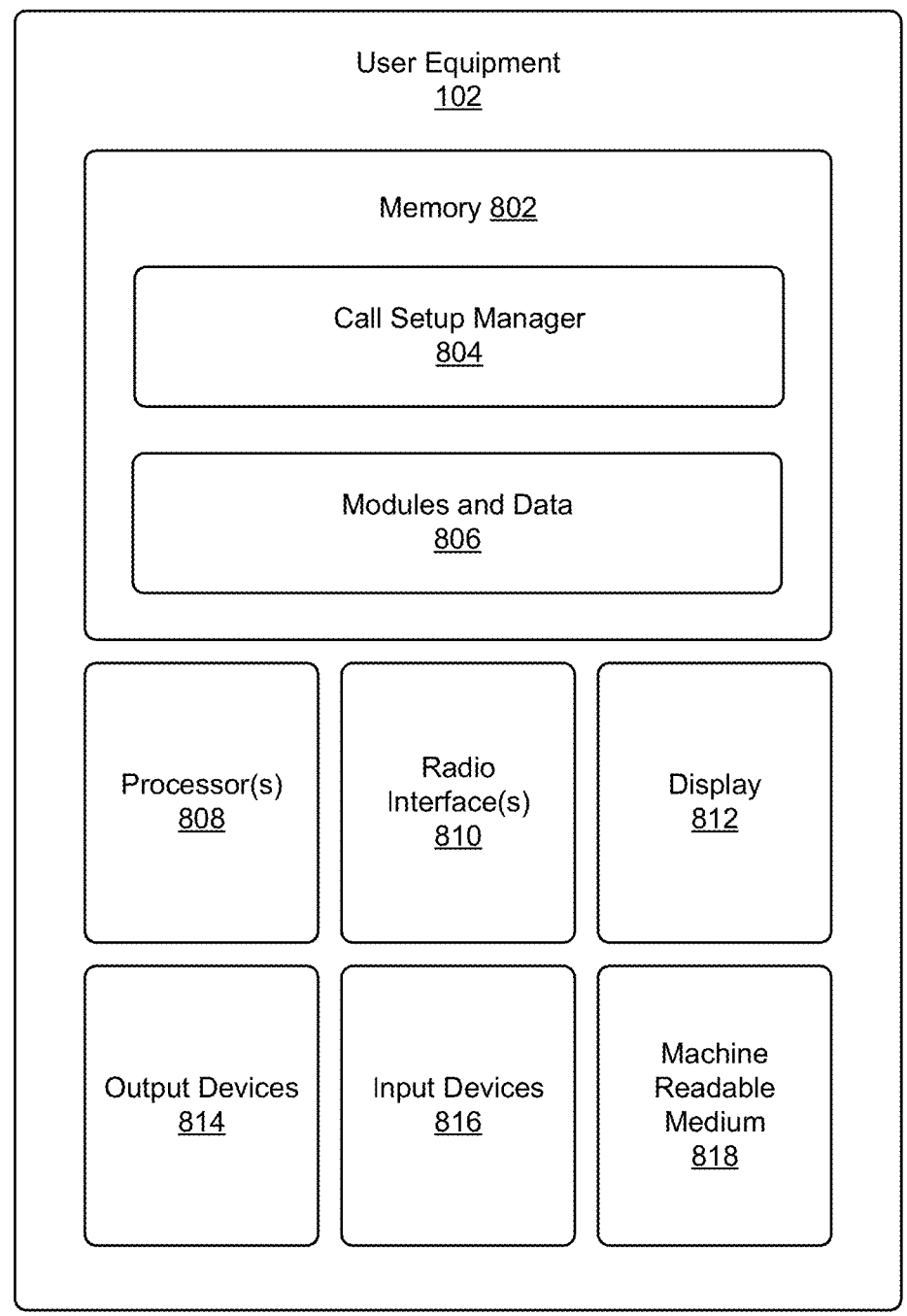
FIG. 8 depicts an example system architecture for a user equipment.

FIG. 8 depicts an example system architecture for a UE 102, in accordance with various examples. As shown, a UE 102 can have memory 802 storing a call setup manager 804, and other modules and data 806. A UE 102 can also comprise processor(s) 808, radio interfaces 810, a display 812, output devices 814, input devices 816, and/or a machine readable medium 818.

In various examples, the memory 802 can include system memory, which may be volatile (such as RAM), non-volatile (such as ROM, flash memory, etc.) or some combination of the two. The memory 802 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 804 can send and/or receive messages comprising RCS service including SIP messages associated with setup and management of a call session via the IMS 414. The SIP messages can include any of the SIP messages shown in FIGS. 5 and 6, and/or other SIP messages.

The other modules and data 806 can be utilized by the UE 102 to perform or enable performing any action taken by the UE 102. The modules and data 806 can include a UE platform, operating system, and applications, and data utilized by the platform, operating system, and applications.

In various examples, the processor(s) 808 can be a central processing unit (CPU), a graphics processing unit (GPU), or both CPU and GPU, or any other type of processing unit. Each of the one or more processor(s) 808 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 808 may also be responsible for executing all computer applications stored in the memory 802, which can be associated with common types of volatile (RAM) and/or nonvolatile (ROM) memory.

The radio interfaces 810 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 810 can be compatible with multiple radio access technologies, such as 5G radio access technologies and 4G/LTE radio access technologies. Accordingly, the radio interfaces 810 can allow the UE 102 to connect to the host telecommunication system 104 and/or the home telecommunications system 110 described herein.

The display 812 can be a liquid crystal display or any other type of display commonly used in UEs 102. For example, display 812 may be a touch-sensitive display screen, and can then also act as an input device or keypad, such as for providing a soft-key keyboard, navigation buttons, or any other type of input. The output devices 814 can include any sort of output devices known in the art, such as the display 812, speakers, a vibrating mechanism, and/or a tactile feedback mechanism. Output devices 814 can also include ports for one or more peripheral devices, such as headphones, peripheral speakers, and/or a peripheral display. The input devices 816 can include any sort of input devices known in the art. For example, input devices 816 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 818 can store one or more sets of instructions, such as software or firmware, that embodies any one or more of the methodologies or functions described herein. The instructions can also reside, completely or at least partially, within the memory 802, processor(s) 808, and/or radio interface(s) 810 during execution thereof by the UE 102. The memory 802 and the processor(s) 808 also can constitute machine readable media 818.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving, by a server of a visiting network and from a Public Agency Gateway, a first communication requesting location information associated with a first device operating outside a coverage area of a home network of the first device, wherein the Public Agency Gateway is configured to establish an emergency communication between the first device and a second device associated with a Public Service Answering Point and the first device is a roaming device connected to the visiting network;
sending, by the server and to a Home Subscriber Server of the home network, a second communication requesting network node information associated with the first device;
receiving, by the server and from the Home Subscriber Server, an identification of a serving node in the visiting network, wherein the serving node is in communication with the first device;
sending, by the server and based at least in part on the identification of the serving node, a third communication to a network node requesting a geographical location of the first device within the visiting network;
receiving, by the server and from the network node, the geographical location indicating a position of the first device relative to a map coordinate system; and
sending, by the server and to the Public Agency Gateway, the geographical location of the first device for associating with the emergency communication.

2. The system of claim 1, wherein:
the second communication further includes a request for user information associated with the first device, the user information comprising emergency contact information, medical information, or personal information about a user of the first device, and further comprising:
causing the Public Agency Gateway to append the user information and the geographical location to a communication session between the first device and the Public Service Answering Point.

3. The system of claim 1, the operations further comprising:
causing, based at least in part on sending the geographical location of the first device to the Public Agency Gateway, the emergency communication to be associated with the geographical location for sending to the Public Service Answering Point; or
causing, by the server, the Public Agency Gateway to select a Public Service Answering Point from a set of available Public Service Answering Points based at least in part on the geographical location.

4. The system of claim 1, wherein:
sending the third communication requesting the geographical location of the first device within the visiting network comprises sending the third communication using a Mobile Location Protocol or a web service.

5. The system of claim 1, wherein:
the server comprises a Gateway Mobile Location Center, and
the network node comprises a Mobile Management Entity, an Enhanced Serving Mobile Location Center, or an Access and Mobility Management Function implementing a location technique to locate the geographical location of the first device.

6. The system of claim 1, wherein the identification of the serving node comprises a Fully Qualified Domain Name.

7. A method comprising:
receiving, by a server of a visiting network and from a Public Agency Gateway, a first request for location information associated with a first device operating outside a coverage area of a home network of the first device, wherein the first device is a roaming device connected to the visiting network;
transmitting, by the server and to a second device of the home network, a second request for network node information associated with the first device based at least in part on the first request;
receiving, by the server and from the second device of the home network, a location of a network element in the visiting network, wherein the network element is in communication with the first device;
transmitting, by the server and to the network node, a third request for a geographical location of the first device;
receiving, by the server and from the network node, the geographical location of the first device; and
transmitting, by the server and to the Public Agency Gateway, the geographical location of the first device for associating with a communication between the first device and a Public Service Answering Point.

8. The method of claim 7, further comprising:
causing, based at least in part on the geographical location, the Public Agency Gateway to establish an emergency communication between the first device and the Public Service Answering Point; or
causing, by the server, the Public Agency Gateway to select the Public Service Answering Point from a set of available Public Service Answering Points based at least in part on the geographical location.

9. The method of claim 7, wherein:
the visiting network is associated with a host network provider hosting the first device, and
the home network is associated with a home network provider that authenticates an identity of the first device or verifies an amount of data available to the first device for communicating with the Public Service Answering Point.

10. The method of claim 7, wherein:
the location of the network element comprises a location of a cell, an antennae, a transceiver, or a base station of the visiting network, and
the geographical location of the first device is more precise than the location of the network element,
a communication between the first device and a Public Service Answering Point.

11. The method of claim 7, wherein the second request further includes a request for user information associated with the first device, the user information comprising emergency contact information, medical information, or personal information about a user of the first device, and further comprising:
causing the Public Agency Gateway to append the user information and the geographical location to a communication session between the first device and the Public Service Answering Point.

12. The method of claim 7, wherein transmitting the second request or the third request comprises using a Diameter Routing Agent.

13. The method of claim 7, further comprising:
causing a communication session to be established between the first device and the Public Service Answering Point, the communication session comprising one or more of: a transmission control protocol (TCP), an internet protocol (IP), a user datagram protocol (UDP), a simple mail transport protocol (SMTP), a file transfer protocol (FTP), a hypertext transfer protocol (HTTP), or a hypertext transfer protocol secure (HTTPS).

14. The method of claim 7, wherein the geographical location is based at least in part on the server implementing a Mobile Location Protocol or a web service.

15. The method of claim 7, wherein:
the communication between the first device and the Public Service Answering Point is associated with an emergency event,
the server comprises a Gateway Mobile Location Center, and
the second device comprises a Home Subscriber Server.

16. The method of claim 15, wherein:
the first request further indicates a subscriber identifier usable by the server for querying the Home Subscriber Server.

17. One or more non-transitory computer-readable media storing instructions executable by one or more processors, wherein the instructions, when executed, cause the one or more processors to perform operations comprising:
receiving, by a server of a visiting network and from a Public Agency Gateway, a first request for location information associated with a first device operating outside a coverage area of a home network;
transmitting, by the server and to a second device of the home network, a second request for network node information associated with the first device based at least in part on the first request;
receiving, by the server and from the second device of the home network, a network node in the visiting network in communication with the first device;
transmitting, by the server and to the network node, a third request for a geographical location of the first device;
receiving, by the server and from the network node, the geographical location of the first device; and
transmitting, by the server and to the Public Agency Gateway, the geographical location of the first device for associating with a communication between the first device and a Public Service Answering Point.

18. The one or more non-transitory computer-readable media of claim 17, the operations further comprising at least one of:
causing, based at least in part on the geographical location, the Public Agency Gateway to establish an emergency communication between the first device and the Public Service Answering Point; or
causing, by the server, the Public Agency Gateway to select the Public Service Answering Point from a set of available Public Service Answering Points based at least in part on the geographical location.

19. The one or more non-transitory computer-readable media of claim 17, wherein:
the visiting network is associated with a host network provider hosting the first device, and
the home network is associated with a home network provider that authenticates an identity of the first device or verifies an amount of data available to the first device for communicating with the Public Service Answering Point.

20. The one or more non-transitory computer-readable media of claim 17, wherein:
the server comprises a Gateway Mobile Location Center, and
the second device comprises a Home Subscriber Server.

* * * * *